(12) United States Patent
Lotz et al.

(10) Patent No.: US 10,924,905 B2
(45) Date of Patent: Feb. 16, 2021

(54) NEAR FIELD CONNECTION FOR SECURE TRACTOR TRAILER COMMUNICATION, AND ASSOCIATED SYSTEMS AND METHODS

(71) Applicant: PACCAR Inc, Bellevue, WA (US)

(72) Inventors: Josef Lotz, Corinth, TX (US); Clifton Ellis, Weatherford, TX (US)

(73) Assignee: PACCAR INC, Bellevue, WA (US)

( * ) Notice: Subject to any disclaimer, the term of this patent is extended or adjusted under 35 U.S.C. 154(b) by 0 days.

(21) Appl. No.: 15/990,476

(22) Filed: May 25, 2018

(65) Prior Publication Data

US 2019/0364406 A1 Nov. 28, 2019

(51) Int. Cl.
| | | |
|---|---|---|
| *H04B 5/00* | (2006.01) |
| *H04W 4/80* | (2018.01) |
| *H04W 76/10* | (2018.01) |
| *H04W 4/40* | (2018.01) |
| *B62D 53/08* | (2006.01) |
| *H04N 7/18* | (2006.01) |
| *H04W 12/02* | (2009.01) |

(52) U.S. Cl.
CPC ............ *H04W 4/80* (2018.02); *H04W 76/10* (2018.02); *B62D 53/08* (2013.01); *H04N 7/183* (2013.01); *H04W 4/40* (2018.02); *H04W 12/02* (2013.01)

(58) Field of Classification Search
CPC ......... H04W 4/029; H04W 4/46; H04W 4/70; H04W 84/12; B60D 1/015; B60D 1/481; G01M 17/007
USPC ............... 455/41.1, 41.2, 41.3; 340/431, 989
See application file for complete search history.

(56) References Cited

U.S. PATENT DOCUMENTS

| | | | | |
|---|---|---|---|---|
| 6,894,608 B1* | 5/2005 | Gunderson | ............ | B60Q 1/525 340/425.5 |
| 7,182,362 B2* | 2/2007 | Yeakel | .................... | B62D 53/12 280/433 |
| 7,932,815 B2* | 4/2011 | Martinez | .................. | B60D 1/62 455/41.2 |
| 8,167,358 B2* | 5/2012 | Burrows | .............. | B62D 35/001 296/180.1 |
| 8,917,170 B2* | 12/2014 | Padula | ............... | B62D 53/0842 280/426 |
| 9,227,568 B1* | 1/2016 | Hubbell | .................. | B60R 1/081 |

(Continued)

FOREIGN PATENT DOCUMENTS

| | | |
|---|---|---|
| WO | 2014/089033 A1 | 6/2014 |
| WO | 2017/152234 A1 | 9/2017 |

(Continued)

OTHER PUBLICATIONS

Extended European Search Report dated Oct. 16, 2019, issued in European Application No. 19176516.3, filed May 24, 2019, 7 pages.

(Continued)

*Primary Examiner* — Quochien B Vuong

(57) ABSTRACT

Near field connection for secure tractor trailer communication, and associated systems and methods are disclosed herein. In one embodiment, a system for wireless communication between a tractor and a trailer includes a first transceiver (TRX) attached to the tractor, and a second TRX attached to the trailer. An engagement between the tractor and the trailer brings the first TRX within an operational distance to the second TRX.

21 Claims, 8 Drawing Sheets

(56) References Cited

U.S. PATENT DOCUMENTS

| | | | |
|---|---|---|---|
| 9,316,737 B2* | 4/2016 | Baade | G01S 19/01 |
| 9,409,510 B1* | 8/2016 | Feagan | B60D 1/64 |
| 9,415,759 B2* | 8/2016 | Greene | B60T 13/263 |
| 9,975,588 B2* | 5/2018 | Mohamad Jembari | B62D 53/12 |
| 2011/0279253 A1* | 11/2011 | Suda | G06Q 10/0833 340/431 |
| 2016/0023587 A1 | 1/2016 | Bean | |
| 2016/0052453 A1* | 2/2016 | Nalepka | B60R 1/00 348/148 |
| 2017/0334355 A1* | 11/2017 | Hubbell | G08G 1/166 |
| 2018/0099712 A1* | 4/2018 | Bean | H04L 12/4625 |
| 2019/0118814 A1* | 4/2019 | Wood | B60Q 1/346 |
| 2019/0235519 A1* | 8/2019 | Carter | G01S 13/874 |

FOREIGN PATENT DOCUMENTS

| | | | |
|---|---|---|---|
| WO | 2018/035566 A1 | 3/2018 | |
| WO | 2019/042958 A1 | 3/2019 | |

OTHER PUBLICATIONS

European Communication in Application 19176516.3, dated Oct. 16, 2019, 7 pages.

* cited by examiner

NEAR FIELD CONNECTION FOR SECURE TRACTOR TRAILER COMMUNICATION, AND ASSOCIATED SYSTEMS AND METHODS

BACKGROUND

Some commercial vehicles, such as semi-trailer trucks, include a combination of a tractor and a semi-trailer. An example of such semi-trailer truck combination is a Gross Vehicle Weight Rated (GVWR) Class 8 tractor that pulls a trailer.

FIG. 1 is a side plan view of a tractor and a trailer in accordance with a conventional technology. A tractor 12 and a trailer 11 form the semi-trailer truck combination. After the combination is formed, an operator plugs electrical cables 13 from the tractor 12 into a plug on the trailer 11, thus enabling electrical communication between the tractor 12 and the trailer 11.

In operation, the tractor 12 brings the trailer 11 to a destination, for example, to a loading depot. The tractor 12 may disengage from the trailer 11, engage with another trailer, and pull that trailer to another destination, while the original trailer remains at the loading depot. Such interchangeability of trailers improves utilization of the tractor 12, because idle usage is reduced.

FIG. 2 is a partially schematic view of an engagement between a tractor and a trailer in accordance with conventional technology. Typically, the trailer 11 includes an engagement pin 22 (also referred to as a "kingpin"), and the tractor 12 includes a corresponding horse-shoe shaped coupling device 24 (also referred to as a "fifth wheel"). In addition to disengaging/engaging the mechanical connections between the kingpin 22 and the fifth wheel 24, the driver also plugs the cable 13 and air hoses into a header on the trailer 11. The kingpin/fifth wheel connections and the plugs on the cables are standardized in the trucking industry to enable seamless trailer exchanges.

However, the standardized plugs and cables necessitate standardized operation of the electrical controls and standardized data exchanges between the tractor and the trailer. As a result, any variation from the standardized functions or data exchanges through the cables requires special parts that may be expensive and difficult to install. Accordingly, there remains a need for cost- and space-effective electrical connections between the tractor and the trailer that address one or more problems of the prior art systems.

SUMMARY

This summary is provided to introduce a selection of concepts in a simplified form that are further described below in the Detailed Description. This summary is not intended to identify key features of the inventive technology, nor is it intended to be used as an aid in determining the scope of the claimed subject matter.

Briefly, the inventive technology uses wireless communication between the tractor and the trailer. In some embodiments, the tractor and the trailer each include a transceiver (TRX) for a short range communication, for example, the wireless communication in the 1 cm-1 m range. One of the transceivers may be carried on or near the kingpin of the trailer, and the other transceiver may be carried on or near the fifth wheel of the tractor. When the kingpin and the fifth wheel engage, the two transceivers are positioned within a prescribed range to establish wireless communication. In at least some embodiments, a relatively close proximity between the two transceivers eliminates, or at least reduces, the incidence of hacking of the communication between transceivers, or accidental pairings between transceivers.

Some examples of data and/or instructions exchanged between the transceivers are: unique identifier of the trailer, trailer data such as axle weight and wheel speed, commands for the backup camera of the trailer, control commands to the trailer such as lighting, image data acquired by the backup camera, instructions for opening/closing of the fins of the trailer (also referred to as the "whale tail"), etc.

One advantage of the exchange of data/instructions between wireless transceivers is a relatively easy customization compared to data/instructions carried through the cables that connect the tractor with the trailer. For example, customization may only require a software update.

In some embodiments, once the proximity-based pairing is established, a secure communication (e.g., encrypted communication) between transceivers can be maintained even after the tractor disengages from the trailer, therefore no longer satisfying the proximity requirement. In some embodiments, the paired transceivers may allow data access from an outside transceiver, for example from the transceiver carried by an outside operator, or housed outside of the tractor/trailer combination.

In some embodiments, a system for wireless communication between a tractor and a trailer includes a first transceiver (TRX) attached to the tractor, and a second TRX attached to the trailer. An engagement between the tractor and the trailer brings the first TRX within an operational distance to the second TRX. In one aspect, the first TRX is attached to a fifth wheel of the tractor, and the second TRX is attached to a kingpin of the trailer.

In another aspect, the system also includes a first TRX holder configured to carry the first TRX. The first TRX holder includes a first locking feature. The system also includes a second TRX holder configured to carry the second TRX. The second TRX holder includes a second locking feature. The first locking feature and the second locking feature engage when the tractor engages with the trailer. In one aspect, in an engaged position of the tractor and the trailer, a distance between the first TRX and the second TRX is less than 1 m.

In one aspect, the first TRX and the second TRX communicate at a near-field radio frequency band of 13.56 MHz. In one aspect, the system of claim 1 also includes a third TRX communicatively coupled to at least one of the first TRX or the second TRX. In another aspect, the third TRX is carried by an operator. In another aspect, the third TRX is housed in a base of a loading depot.

In one aspect, at least one weight sensor senses a load on an axle of the trailer, where the weight sensor is in a wireless communication with the second TRX. In one aspect, the system also includes a backup camera attached to the trailer, where the backup camera is in a wireless communication with the second TRX.

In one embodiment, a method for wireless communication between a tractor and a trailer includes engaging the tractor with the trailer, where the tractor carries the first transceiver (TRX) and the trailer carries the second TRX. The method also includes, bringing the first TRX within an operational distance from the second TRX by engaging the tractor with the trailer. The method also includes establishing a wireless communication between the first TRX and the second TRX.

In one aspect, the wireless communication is a secure wireless communication. In one aspect, the method also includes disengaging the tractor from the trailer, and maintaining the secure wireless communication between the first TRX and the second TRX after disengaging the tractor from the trailer.

In one aspect, the wireless communication between the first TRX and the second TRX is established after engaging the tractor with the trailer is completed. In one aspect, the method also includes wirelessly exchanging data between the first TRX and the second TRX. In one aspect, the data include instructions to extend fins on the trailer. In another aspect, the data include axle weight obtained by a weight sensor. In one aspect, the data include images obtained by a backup camera carried by the trailer. In another aspect, the data include a unique identifier of the trailer.

In one aspect, the method also includes measuring a distance from a trailer to another object by a proximity sensor carried by the trailer, and wirelessly transmitting the distance from the second TRX to the first TRX. In another aspect, the method also includes, after establishing the wireless communication between the first TRX and the second TRX, establishing a wireless communication between a third TRX and at least one of the first TRX and the second TRX, where the third TRX is external to the tractor and the trailer. In one aspect, the third TRX is carried by a base in a loading depot.

DESCRIPTION OF THE DRAWINGS

The foregoing aspects and many of the attendant advantages of this inventive technology will become more readily appreciated as the same become better understood by reference to the following detailed description, when taken in conjunction with the accompanying drawings, wherein.

DETAILED DESCRIPTION

The following disclosure describes various embodiments of systems and associated methods for near field connection for secure tractor trailer communication. A person skilled in the art will also understand that the technology may have additional embodiments, and that the technology may be practiced without several of the details of the embodiments described below with reference to FIGS. 3-8.

Although exemplary embodiments of the present disclosure are described with reference to the tractors having a fifth wheel connection for the trailers (e.g., class 8 trucks), it will be appreciated that aspects of the present disclosure have wider application, and therefore, may be suitable for use with many other types of connections between the trucks and trailers. Some examples of such connections are a pick-up truck and a camper, a box truck pulling a trailer, etc.

Figure 1:
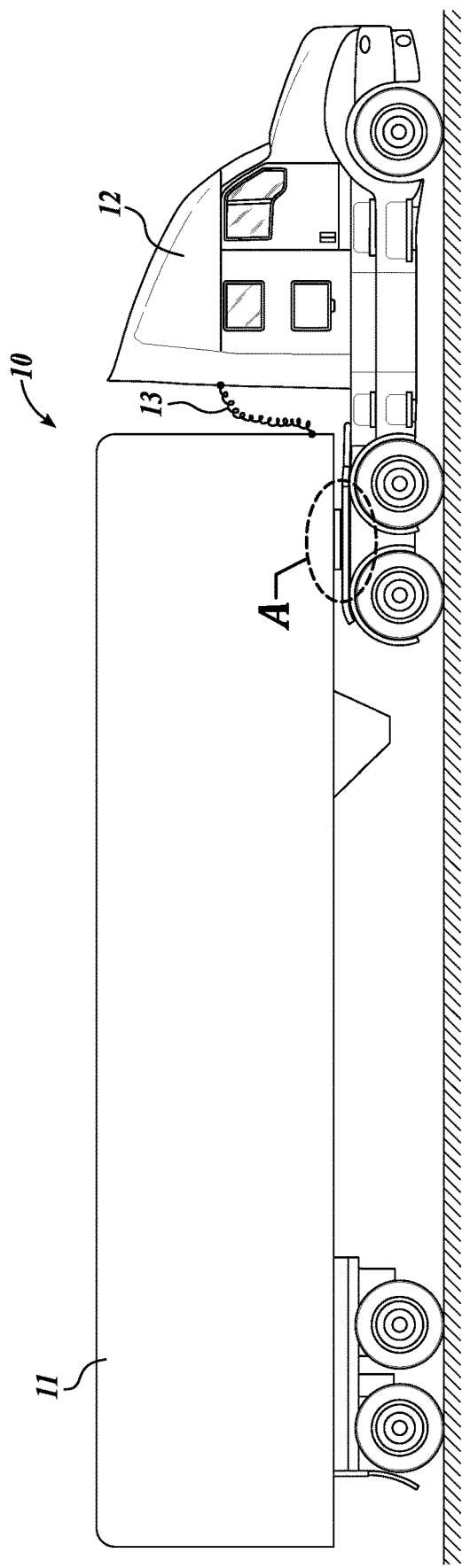
FIG. 1 is a side plan view of a tractor and a trailer in accordance with a conventional technology.
Figure 2:
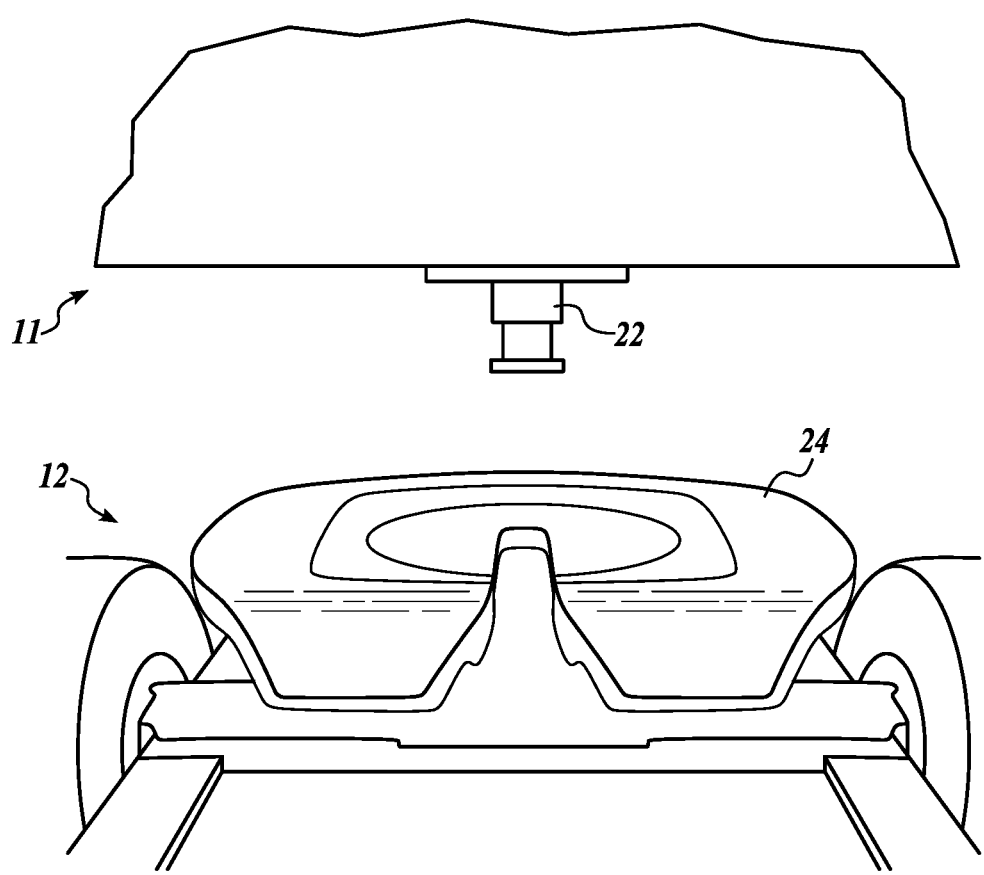
FIG. 2 is a partially schematic view of an engagement between a tractor and a trailer in accordance with conventional technology.
Figure 3:
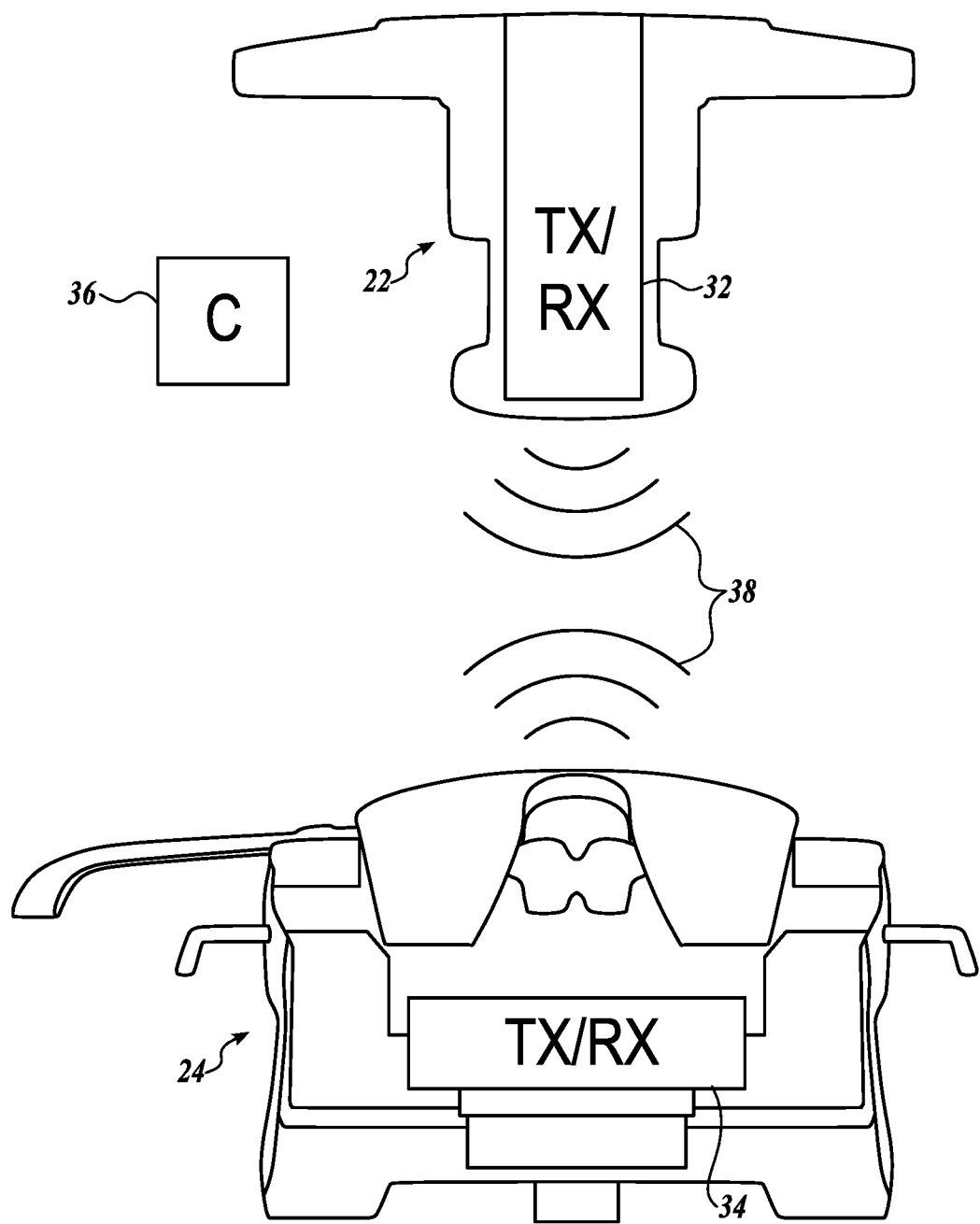
FIG. 3 is a partially schematic view of a wireless data exchange in accordance with an embodiment of the present technology.
Figure 4:
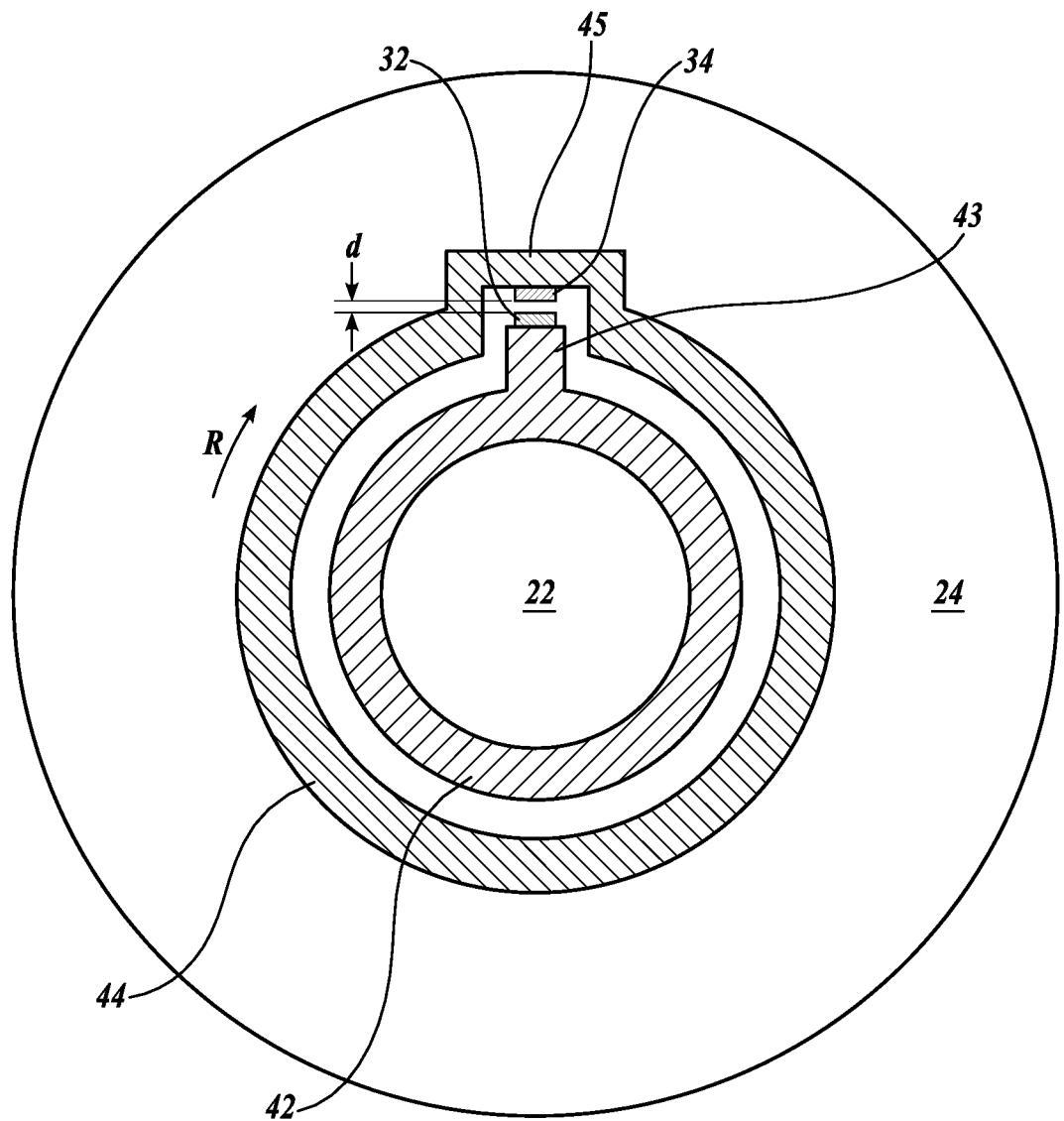
FIG. 4 is a partially schematic view of an engagement between transceivers in accordance with an embodiment of the present technology.

FIG. 3 is a partially schematic view of wireless data exchange 38 in accordance with an embodiment of the present technology. In some embodiments, the fifth wheel (or other engagement mechanism) 24 of the tractor carries a receiver (RX), a transmitter (TX) or a transceiver (TRX) 34 (hereinafter collectively referred to as a TRX). The kingpin 22 carries a corresponding TX, RX or TRX 32. In some embodiments, TRX-es 32 and 34 can only communicate within a limited distance. For example, the International Organization for Standardization and the International Electrotechnical Commission (ISO/IEC) 18000-3 provides specifications for TRX-es that can typically couple within 1 m distance, at a frequency of 13.56 MHz±7 kHz. In other embodiments, TRX-es can couple within 4 cm distance or within 1 cm distance. Other non-exclusive examples of useful wireless communication standards include Bluetooth Low Energy (LE) specified in "Bluetooth Core Specification" versions 4.0 and 5.0. In general, the Bluetooth LE has a maximum range of about 100 m, but can be filtered to operate at shorter distances. Collectively, radio communication that is limited to about 1 m operational distance is sometimes referred to as near field communication or NFC.

In some embodiments, when the fifth wheel 24 engages with the kingpin 22 of the trailer, their respective TRX-es 34 and 32 become sufficiently proximate to establish wireless communication. The process of establishing wireless communication is sometimes referred to as "pairing." The maximum allowable distance between the TRX-es for wireless communication is referred to as operational distance. Once paired, TRX-es 34 and/or 32 may also communicate with a controller or computer 36. For example, the tractor may include the computer 36 for communicating with the TRX 34 either wired or wirelessly.

Since the distance required for establishing wireless communication is relatively short, for example, less than 1 m, the placement of TRX-es 34 and 32 may also eliminate accidental pairing with TRX-es on other tractors or trailers. Furthermore, hacking of the wireless connection between TRXes becomes more difficult.

Under some scenarios, for example when the coupling distance between TRX-es is within the cm-range, the TRX-es may move outside of their operational distance relatively easily as the tractor/trailer combination enters a curve in the road, thus causing possible intermittency in the operation of the TRX-es. Therefore, in some embodiments of the inventive technology, the TRX-es should be held within coupling distance even when the tractor/trailer combination enters a curve, downhill/uphill road, in presence of vibrations, etc., as described in more detail below with respect to FIG. 4.

In some embodiments, the fifth wheel 24 carries a TRX holder 44 and the kingpin 22 carries a mating TRX holder 42. In operation, a locking feature 43 of the TRX holder 42 engages with a locking feature 45 of the TRX holder 44, therefore aligning the TRX 32 of the kingpin 22 and the TRX 34 of the fifth wheel 24 within their operational distance (e.g., 1 cm, 4 cm, etc.). As a result, TRX-es 32 and 34 can establish and maintain wireless communication.

In some embodiments, one or both TRX holders 42 and 44 may be rotatable about their axes (e.g., in a direction R), while preserving their mutual orientation because of locking features 43 and 45. Therefore, in at least some embodiments, even when the tractor/trailer combination turns, TRX-es 32 and 34 remain within their operational distance (e.g., distance d) to maintain wireless communication.

The TRX holders 42 and 44 illustrate sample devices for pairing TRX-es and maintaining their distance. However, other TRX holders are also possible, for example, conically or cylindrically shaped holders, magnetic holders, etc. Furthermore, in some embodiments, TRX holders may be mounted aside from the kingpin/fifth wheel surfaces. For example, TRX holder 42 may be mounted on the surface of the trailer 11 that faces the fifth wheel 24 of the tractor 12.

Figure 5:
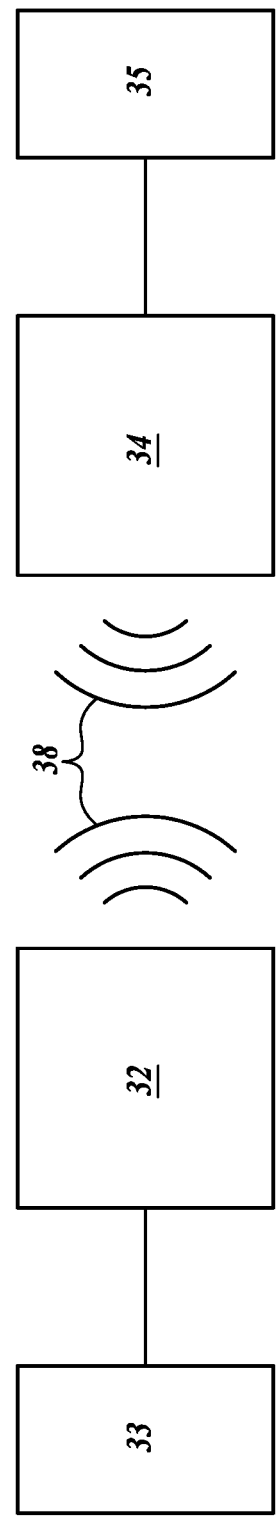
FIG. 5 is a schematic view of communication between transceivers in accordance with an embodiment of the present technology.

FIG. 5 is a schematic view of communication between TRX-es in accordance with an embodiment of the present technology. In some embodiments, TRX 32 of the tractor has a dedicated power supply 33 (e.g., a battery). In many near field communication applications, the power supply 33 may last several years between replacements because the TRX sinks electrical current in the μA-range. In other embodiments, TRX 32 may be powered from a battery of the tractor, directly or through voltage converters. The trailer's TRX 34 may also be powered through a dedicated power supply 35 or through another battery carried by the trailer.

Figure 6:
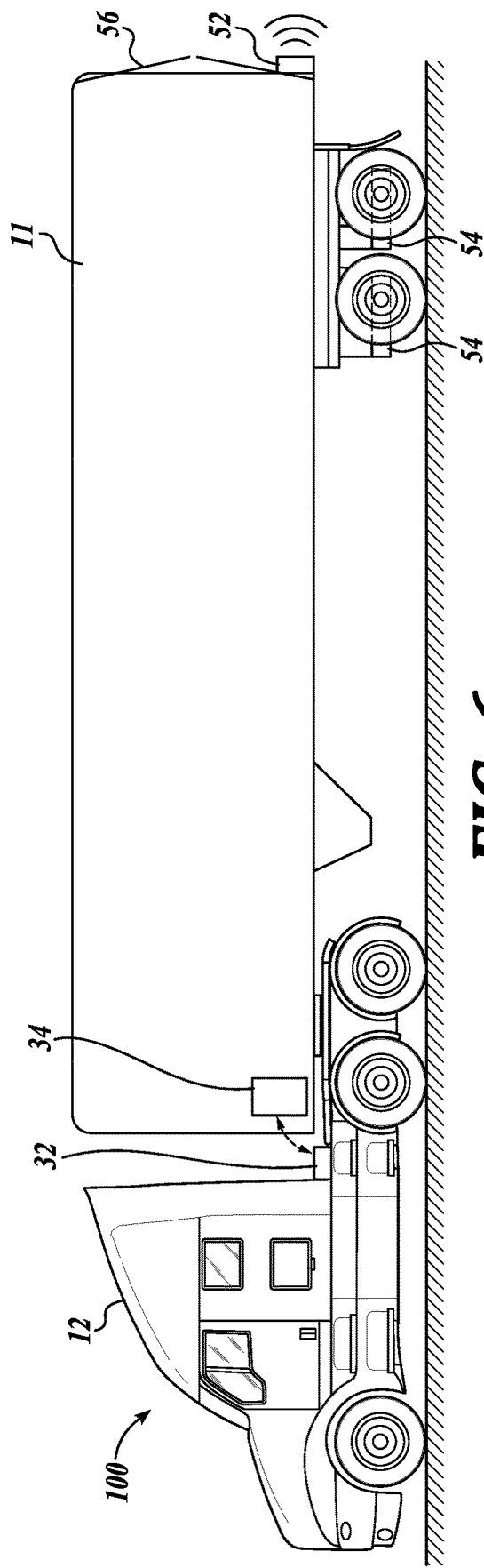
FIG. 6 is a partially schematic view of sensor operation in accordance with an embodiment of the present technology.

FIG. 6 is a partially schematic view of sensor operation in accordance with an embodiment of the present technology. In some embodiments, the trailer 11 is equipped with a proximity sensor or camera 52, weight sensors 54, and/or other sensors. In some embodiments, the tractor 12 can also carry sensors. In operation, the camera 52 may transfer images of the area behind the trailer through the TRX-es to a display in the cabin or to an image processing device, for example, the controller 36 or other computing device.

In the illustrated embodiment, TRX-es 32 and 34 are located away from the fifth wheel/kingpin. However, distance between TRX-es 32 and 34 still allows for pairing and maintaining the communication between the TRX-es, while minimizing hacking and accidental pairings.

In some embodiments, the weight sensors 54 can measure axle loading of the trailer in real time, without the trailer having to drive over the weight balance. For example, axle loading may be measured as the trailer is being loaded with cargo, while the distribution and/or amount of cargo may be adjusted to conform to the regulations for axle loading.

In some embodiments, the trailers 11 are equipped with fins 56 that reduce drag of at high speeds. The fins 56 may be extendable by transmitting a signal from the tractor 12 through the TRX-es to an actuator of the fins 56.

Figure 7:
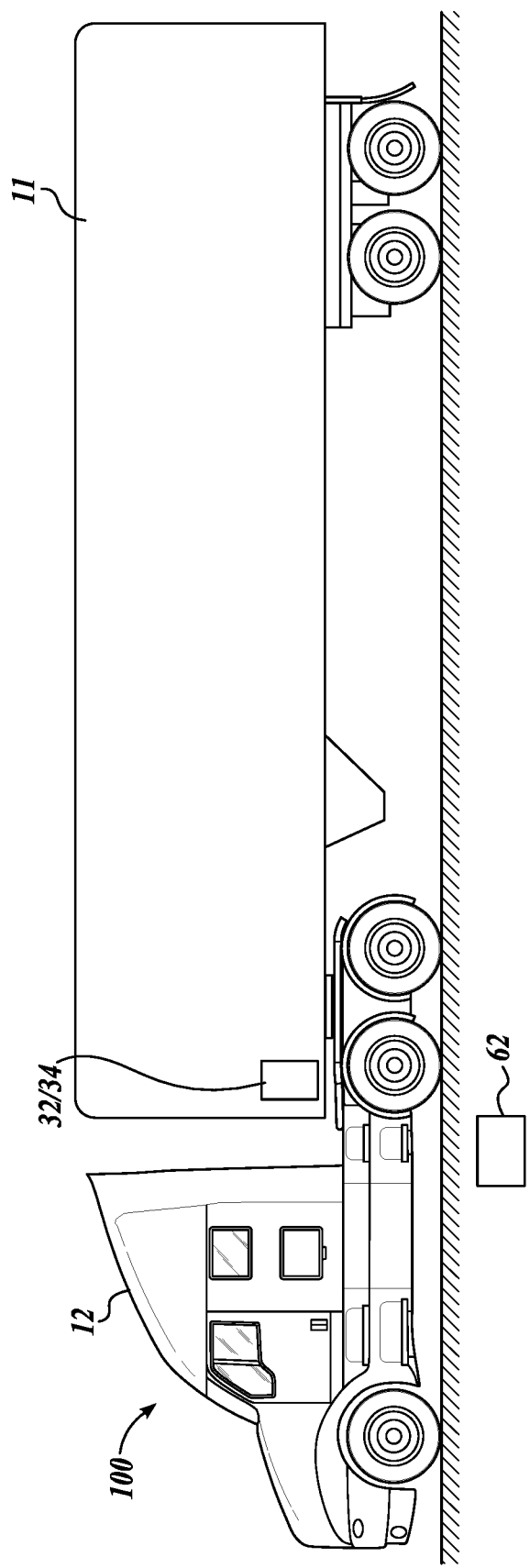
FIGS. 7 and 8 are side plan views of transceiver pairings in accordance with a conventional technology.
Figure 8:
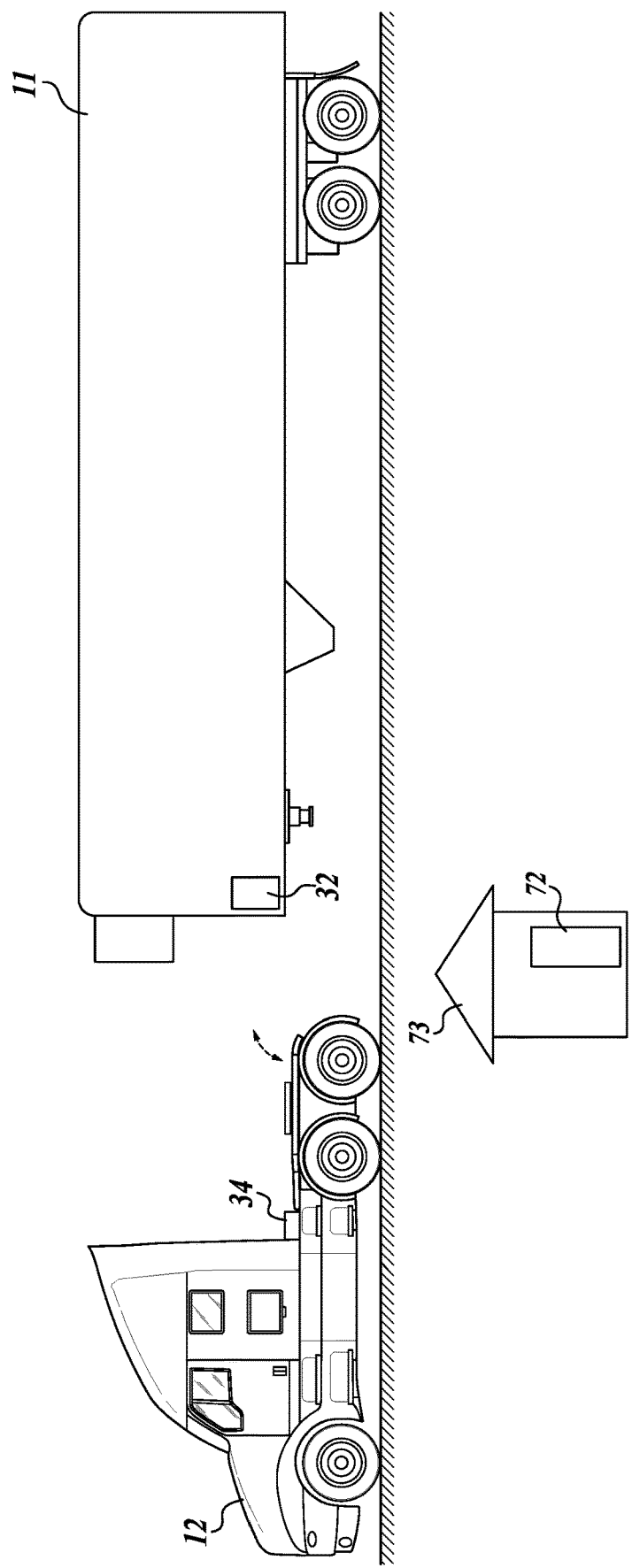

FIGS. 7 and 8 are side plan views of transceiver pairings in accordance with a conventional technology. FIG. 7 illustrates TRX-es 32 and 34 in wireless communication with another TRX 62. In some embodiments, TRX 62 may be a mobile TRX that is carried by an operator (not shown) to collect data from the tractor/trailer combination (e.g., data about axle loading) and/or to issue instructions for the tractor/trailer combination (e.g., instructions to turn on the proximity sensor).

FIG. 8 illustrates TRX-es 32 and 34 in wireless communication with another TRX 72 that may be housed in a base 73. In some embodiments, TRX 72 collects data or sends instructions to TRX-es 32 and 34, as described with respect to the additional TRX 62 shown in FIG. 7.

TRX-es 32 and 34 may establish encrypted communication when they are paired. Thereafter, communication between the TRX-es remains secure against hackers even when TRX-es 32 and 34 are no longer proximate enough for pairing to take place. For example, after the tractor 12 and the trailer 11 are not engaged anymore, the TRX-es may continue to communicate through encrypted wireless communication within the distance limits for a particular wireless communication. In some embodiments, wireless communication between TRX-es 32 and 34 ends when the tractor 12 engages with another trailer 11.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, application specific integrated circuit (ASIC), controller or data processor that is specifically programmed, configured or constructed to perform one or more of the computer-executable instructions described above. Of course, any logic or algorithm described herein can be implemented in software or hardware, or a combination of software and hardware.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

We claim:

1. A system for wireless communication between a tractor and a trailer, comprising:
   a first transceiver (TRX) attached to a first part of the tractor;
   a second TRX attached to a second part on the trailer, wherein the first part is a coupling device and the second part is an engagement pin, and the first and second parts form a mechanical coupling interface between tractor and the trailer;
   a first TRX holder on the first part and configured to carry the first TRX, the first TRX holder comprising a first locking feature; and
   a second TRX holder on the second part configured to carry the second TRX, the second TRX holder comprising a second locking feature;
   wherein the first locking feature and the second locking feature are configured to be coupled while the first part engages with the second part, and
   wherein coupling between the first locking feature and the second locking feature brings the first TRX within an operational distance of the second TRX, wherein the operational distance is 4 centimeters or less, and wherein the first locking feature and the second locking feature, when coupled, cooperate to preserve an orientation between the first TRX and the second TRX regardless of rotation of the first part relative to the second part.

2. The system of claim 1, wherein the first TRX is attached to a fifth wheel of the tractor, and the second TRX is attached to a kingpin of the trailer.

3. The system of claim 1, wherein the first TRX and the second TRX communicate at a near-field radio frequency band of 13.56 MHz.

4. The system of claim 1, further comprising a third TRX communicatively coupled to at least one of the first TRX or the second TRX.

5. The system of claim 4, wherein the third TRX is carried by an operator.

6. The system of claim 4, wherein the third TRX is housed in a base of a loading depot.

7. The system of claim 1, further comprising at least one weight sensor configured to sense a load on an axle of the trailer, wherein the weight sensor is in a wireless communication with the second TRX.

8. The system of claim 1, further comprising a backup camera attached to the trailer, wherein the backup camera is in a wireless communication with the second TRX.

9. A method for wireless communication between a tractor and a trailer, comprising:
coupling the tractor with the trailer via a mechanical coupling interface, wherein the tractor carries a first transceiver (TRX) supported by a first holder on a fifth wheel of the mechanical coupling interface and the trailer carries a second TRX supported by a second holder on a kingpin of the mechanical coupling interface,. wherein coupling the tractor with the trailer brings the first TRX within an operational distance from the second TRX, the operational distance being 4 centimeters or less, and wherein the first holder and the second holder are arranged such that, when coupled, the first holder and the second holder cooperate to preserve an orientation between the first TRX and the second TRX regardless of rotation of the fifth wheel relative to the kingpin; and
establishing a wireless communication between the first TRX and the second TRX.

10. The method of claim 9, wherein the wireless communication is a secure wireless communication, the method further comprising
retaining the first TRX and the second TRX within the operational distance during vehicle operation via a first locking feature proximate the first TRX and a second locking feature proximate the second TRX.

11. The method of claim 10, further comprising:
disengaging the tractor from the trailer; and
maintaining the secure wireless communication between the first TRX and the second TRX after disengaging the tractor from the trailer.

12. The method of claim 9, wherein the wireless communication between the first TRX and the second TRX is established after engaging the tractor with the trailer is completed.

13. The method of claim 9, further comprising wirelessly exchanging data between the first TRX and the second TRX.

14. The method of claim 13, wherein the data comprise instructions to extend fins on the trailer.

15. The method of claim 13, wherein the data comprise axle weight obtained by a weight sensor.

16. The method of claim 13, wherein the data comprise images obtained by a backup camera carried by the trailer.

17. The method of claim 13, wherein the data comprise a unique identifier of the trailer.

18. The method of claim 13, further comprising:
measuring a distance from a trailer to another object by a proximity sensor carried by the trailer; and
wirelessly transmitting the distance from the second TRX to the first TRX.

19. The method of claim 9, further comprising:
after establishing the wireless communication between the first TRX and the second TRX, establishing a wireless communication between a third TRX and at least one of the first TRX and the second TRX, wherein the third TRX is external to the tractor and the trailer.

20. The method of claim 19, wherein the third TRX is carried by a base in loading depot.

21. A vehicle, comprising:
a first mechanical coupling interface of a tractor configured to couple to a trailer for applying a towing force on the trailer;
a first transceiver (TRX) carried by the first mechanical coupling interface;
a second mechanical coupling interface of the trailer configured to couple to the first mechanical coupling interface of the tractor; and
a second transceiver (TRX) carried by the second mechanical coupling interface;
wherein the first mechanical coupling interface and the second mechanical coupling interface are arranged such that, when coupled, an orientation between the first TRX and the second TRX is maintained regardless of a change in orientation of the tractor relative to the trailer.

* * * * *